No. 815,855. PATENTED MAR. 20, 1906.
W. A. McADAMS.
DISH DRAINER.
APPLICATION FILED JULY 11, 1903.

4 SHEETS—SHEET 1.

Witnesses:
George Barry Jr.
Henry Thieme

Inventor:
William A. McAdams
by attorneys

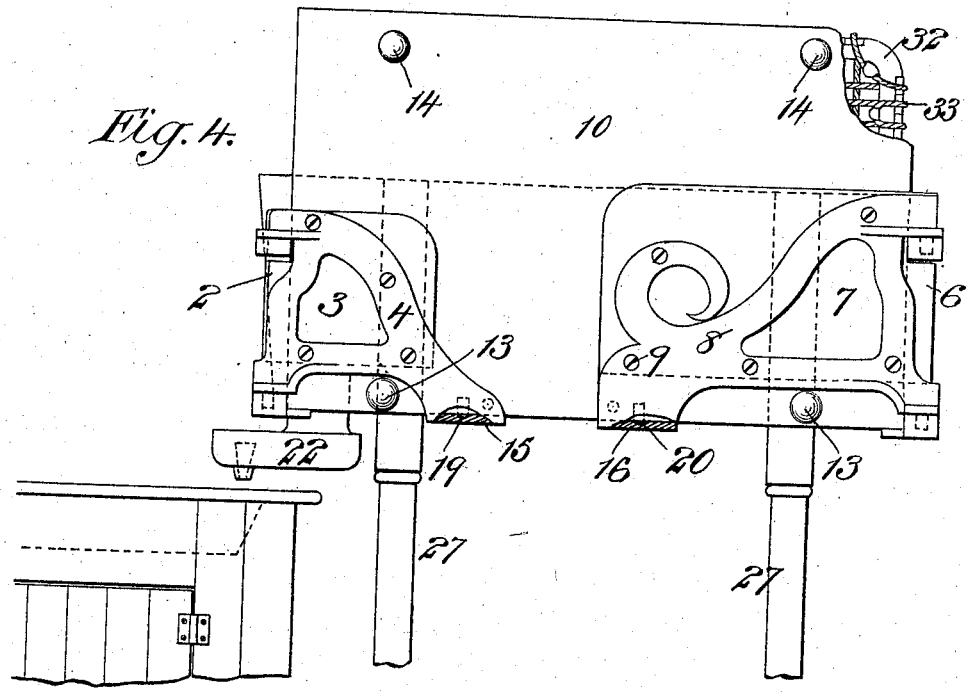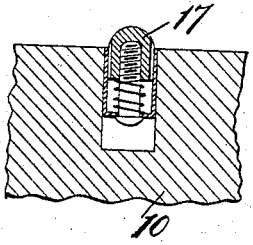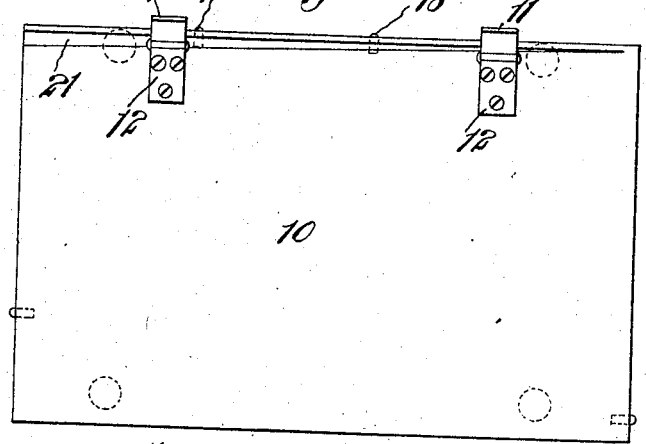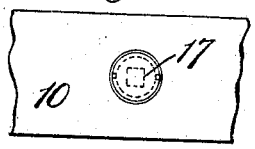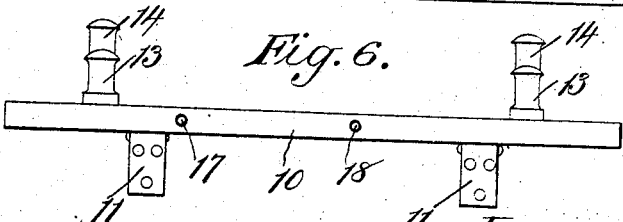

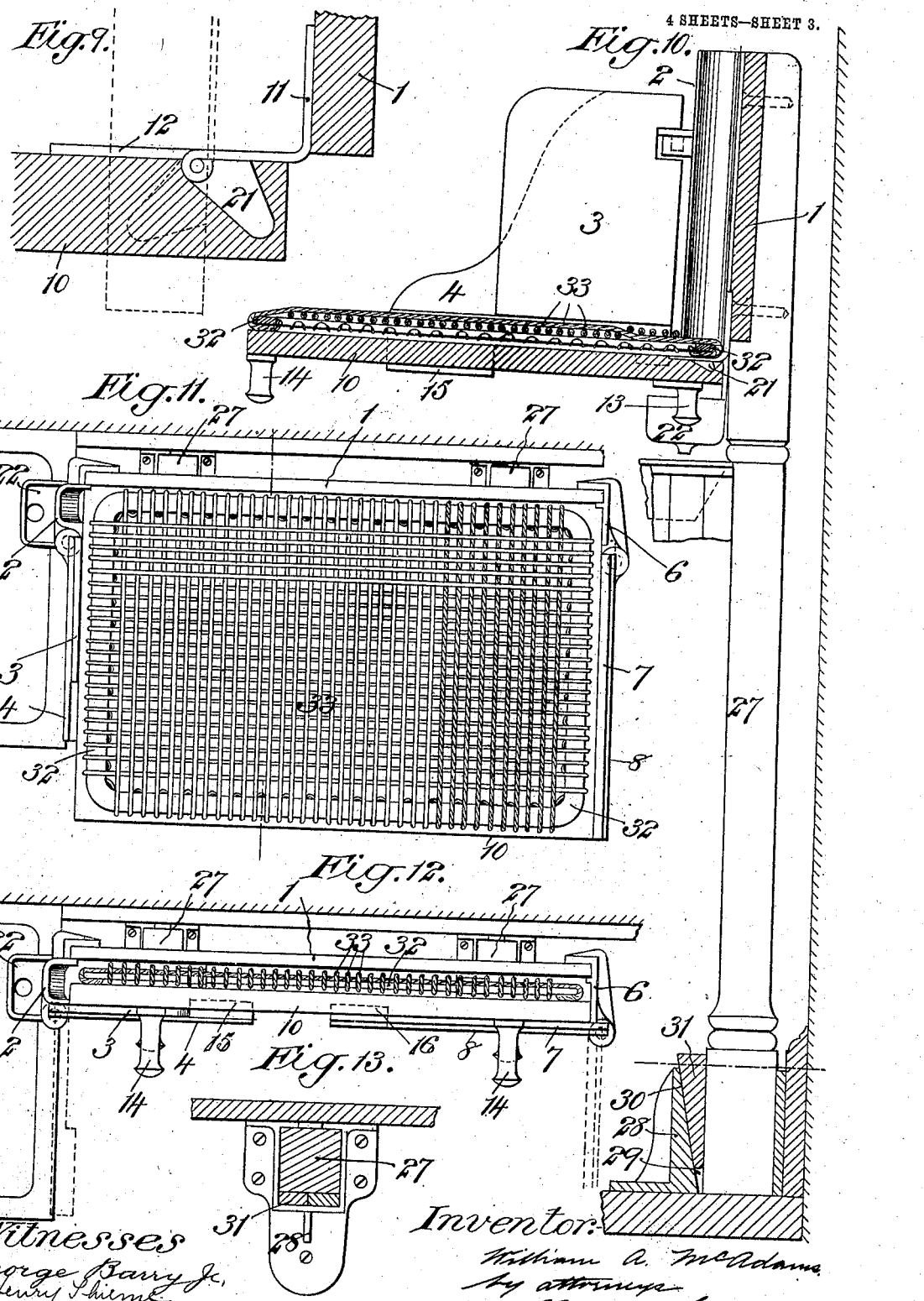

No. 815,855. PATENTED MAR. 20, 1906.
W. A. McADAMS.
DISH DRAINER.
APPLICATION FILED JULY 11, 1903.
4 SHEETS—SHEET 4.
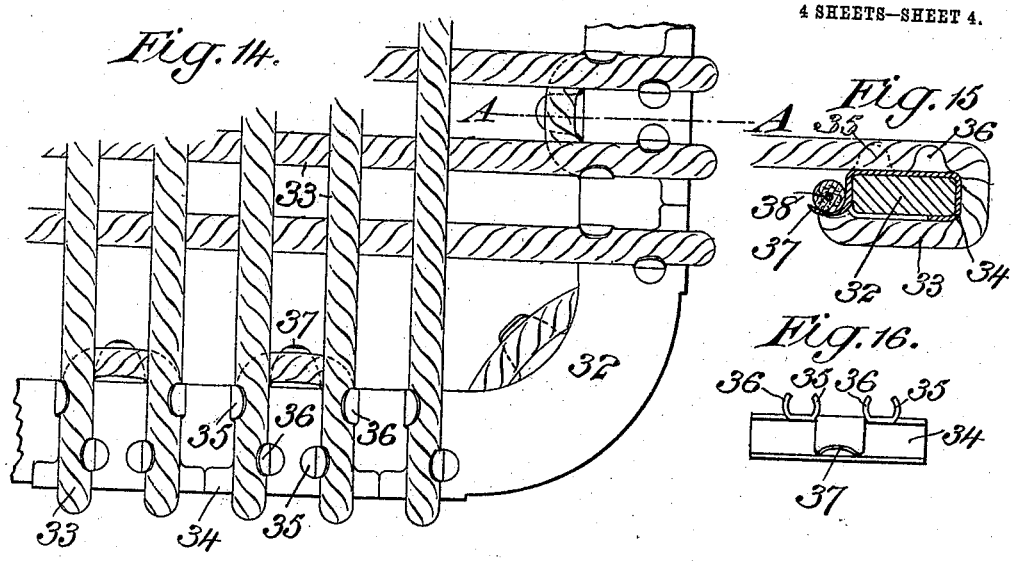
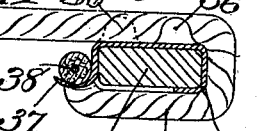
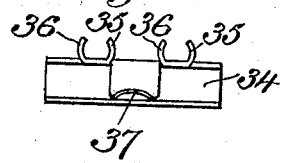
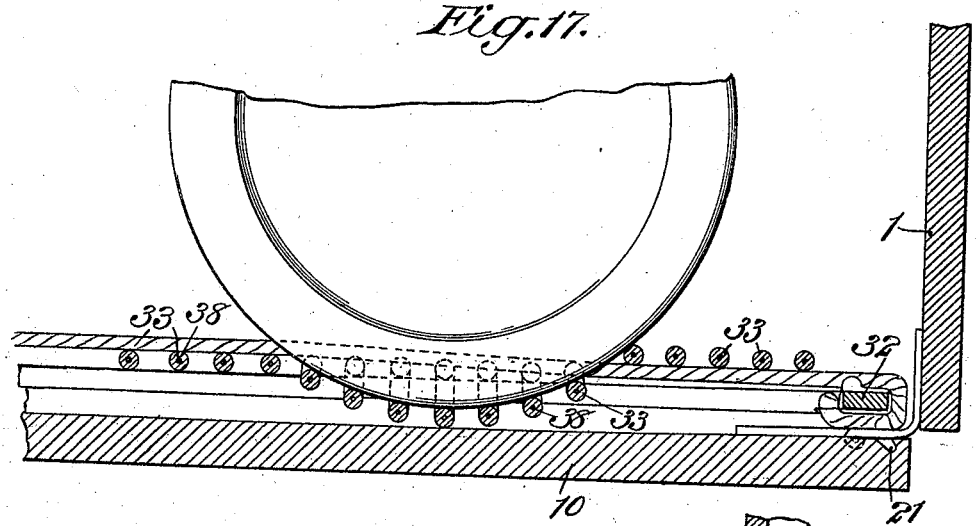
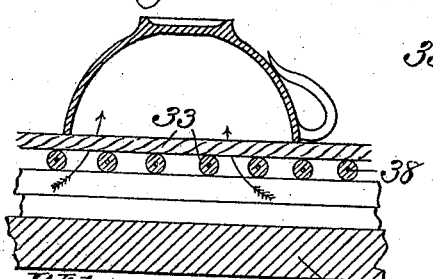
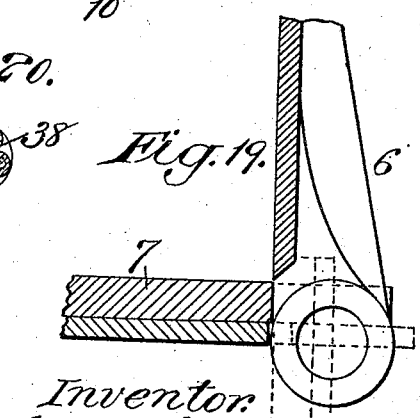

UNITED STATES PATENT OFFICE.

WILLIAM A. McADAMS, OF NEW YORK, N. Y.

DISH-DRAINER.

No. 815,855.  Specification of Letters Patent.  Patented March 20, 1906.

Application filed July 11, 1903. Serial No. 165,090.

*To all whom it may concern:*

Be it known that I, WILLIAM A. MCADAMS, a citizen of the United States, and a resident of the borough of Brooklyn, in the city and State of New York, have invented a new and useful Improvement in Dish-Drainers, of which the following is a specification.

My invention consists in an improvement in dish-drainers, and has for its object to provide an article of this character which embodies a considerable number of improved features whereby the water may be readily drained from dishes of various sizes and shapes after they have been washed.

Another object of my invention is to provide a dish-drainer of the above character which may be readily set up at the desired place and may be folded against its support when not in use, so as to occupy a very small amount of room.

A practical embodiment of my invention is represented in the accompanying drawings, in which—

Figure 1:
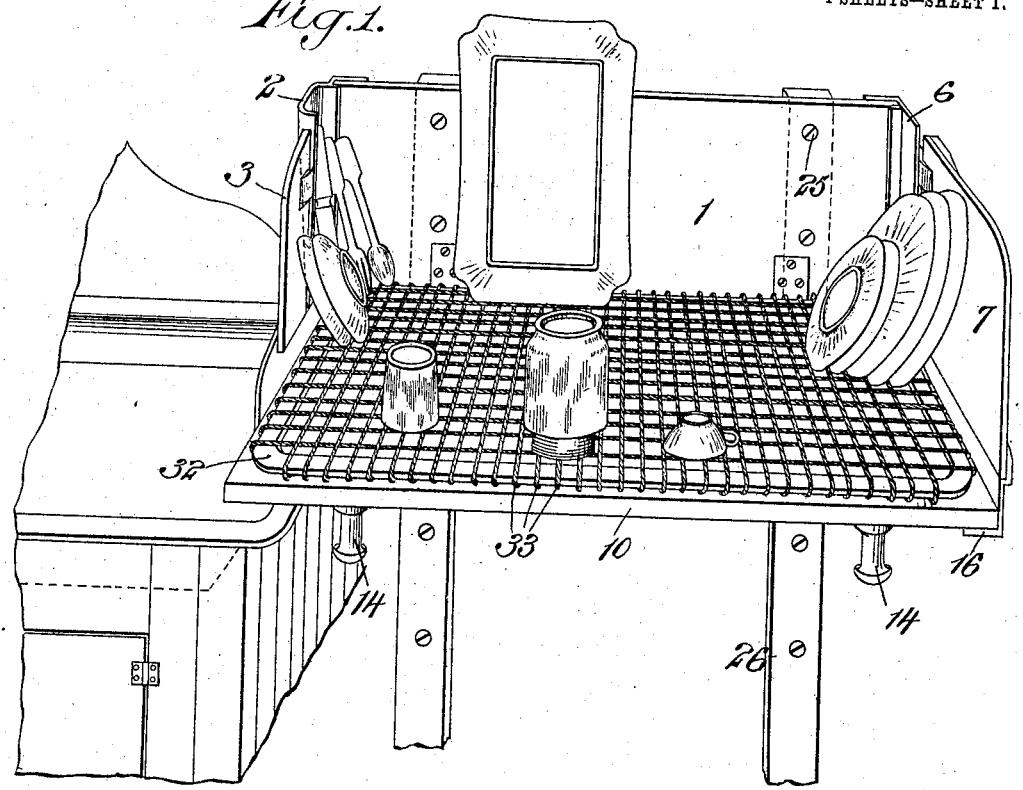
Figure 2:
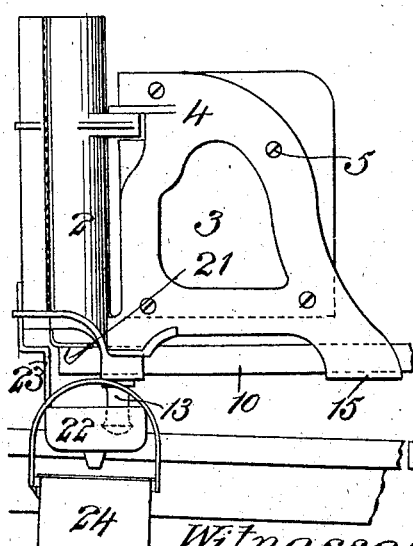
Figure 3:
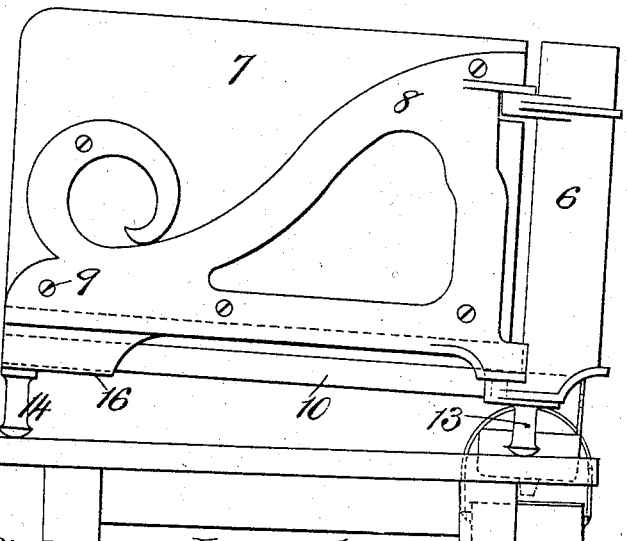

Figure 1 represents the dish-drainer in perspective with dishes thereon in its unfolded position, as in use, a portion of a sink being shown in proximity thereto for receiving the water drained from the dishes. Fig. 2 is a view looking toward the drainage end of the drainer, the tray being removed and the bottom board broken away, the drainer being shown as resting upon a table and a pail being shown in position to receive the drainage water from the drainer. Fig. 3 is a view looking toward the other end of the drainer. Fig. 4 is a front view of the drainer in its folded position, a portion of the sink being shown in proximity thereto and a portion of the bottom board being broken away to show the dish-tray. Fig. 5 is a detail top plan view of the bottom board. Fig. 6 is a view of its rear edge. Fig. 7 is a detail section through one of the spring-catches, which engage the end-board brackets for holding the drainer in its folded position. Fig. 8 is a top plan view of the spring-catch. Fig. 9 is a detail sectional view showing the manner of hinging the bottom board to the back board, so as to permit the tray to be folded between the two, this view also showing the drainage-channel in the bottom board arranged to drain the water when the bottom board is in any of its swinging positions. Fig. 10 is a vertical section taken from front to rear through the drainer, showing the drainer attached to a removable support. Fig. 11 is a top plan view of the drainer in its unfolded position. Fig. 12 is a top plan view of the same in its folded position. Fig. 13 is a cross-section showing the manner of removably securing the drainer to support represented in Fig. 10. Fig. 14 is an enlarged detail top plan view of one corner of the dish-tray, showing the manner of attaching the dish-supporting rope. Fig. 15 is a transverse vertical section taken in the plane of the line A A of Fig. 14. Fig. 16 is a detail view of one of the brackets which attach the rope to the tray-frame. Fig. 17 is a sectional view of a portion of the tray, bottom board, and back board, showing a plate resting on the tray. Fig. 18 is a detail sectional view of a portion of the tray and bottom board, showing a cup resting on the tray and illustrating the manner in which the interior of the cup is ventilated while being drained. Fig. 19 is a horizontal sectional view showing the manner of hinging one of the end boards to its support; and Fig. 20 is an enlarged cross-section through the dish-supporting rope, showing the cord therein for preventing the undue elongation and contraction of the rope under the influence of moisture.

The back board of the drainer is denoted by 1, and it is provided at one end with a channel-bracket 2, to which is hinged an end board 3 by means of a strap 4, to which the end board 3 is secured—as, for instance, by screws 5. To the other end of the back board 1 I secure a bracket 6, to which is hinged an end board 7 by means of a strap 8, to which the end board 7 is secured, as by screws 9.

The bottom board is denoted by 10, and it is hinged a short distance forwardly from its rear end to the back board 1 of the drainer. Each of the hinges which hinge the bottom board 10 to the back board 1 comprises an L-shaped strap 11, secured to the back board 1, and a strap 12, secured to the bottom board 10, so that when the bottom board is swung up into a vertical position, as when the drainer is folded, a space is formed between the bottom board and the back board, within which the dish-tray, to be hereinafter described, is located.

The brackets 2 and 6, carried by the ends of the back board 1, project forward a sufficient distance to permit the end boards 3 and 7 to fold against the outer face of the bottom board 10 when the bottom board is in its vertical position.

The bottom board 10 is provided with inner and outer depending legs 13 and 14 for use in supporting the drainer upon a table, as shown clearly in Fig. 3. The outer legs 14 are made longer than the inner legs 13, so as to cause the water to drain toward the rear end of the bottom board. Where the drainer is used independently of a table, the outer end of the bottom board 10 is supported by inwardly-projected lugs 15 and 16 of the straps 4 and 8 of the end boards.

To yieldingly hold the bottom board in its vertical or folded position, I provide the rear end of the bottom board with spring-actuated catches 17 and 18, which are fitted to enter recesses 19 and 20 in the faces of the lugs 15 and 16 of the hinged straps 4 and 8.

The face of the bottom board 10 near its rear end is provided with a downwardly and inwardly extended longitudinal channel 21, arranged to receive the drainage water from the face of the bottom board 10 as it runs inwardly on the same. This channel 21 gradually increases in depth from one side of the board to its other side, so as to lead the water along the same and discharge it into a cup 22, secured by a hanger 23 to the back board 1 of the drainer. This channel 21 is so arranged that it will receive the water therein from the face of the bottom board 10, whether the board be in a horizontal or vertical position, and the cup 22 is so arranged that it will receive the water from the discharge end of the channel 21 irrespective of the position of the bottom board 10. The water may be permitted to escape from the cup 22 into the sink, (shown in Fig. 1,) where the drainer is located in proximity to a sink, or into a pail 24, as shown in Fig. 2, when the drainer is supported upon a table and is not located conveniently with respect to a sink.

In Fig. 1 I have shown the back board as being secured by screws 25 to uprights 26, which may be permanently secured to the wall of the room.

In Figs. 2 and 3 I have shown the drainer as supported upon a table.

In Figs. 10 to 13, inclusive, I have shown the drainer as supported by removable posts 27, to which the back board 1 is secured. These posts are made removable, as follows: A base 28 is secured to the floor, which base is provided with a socket 29, having a tapered wall 30. The lower end of the post 27 is inserted within the socket 29 and a wedge 31 is driven in between the front of the post and the tapered wall 30, so as to removably lock the post within the base in a rigid manner. This manner of supporting the drainer is advisable where it is not thought best to secure the drainer permanently to the wall of the room.

My improved open-mesh tray for supporting the dishes comprises a rectangular frame 32 and a rope 33, extended back and forth longitudinally and laterally. The frame 32 is provided with a plurality of clips 34, clamped to the frame for attaching the rope 33 to the frame. Each of these clips 34 is provided with two pairs of upwardly-extended spacing-lugs 35 36 for engaging the opposite sides of two portions of the rope as it passes over the frame for holding the rope in position and spacing the two portions the proper distance apart. This clip 34 is further provided with an inwardly-extended lip 37, around which the rope passes. The sections of the rope which lead inwardly and outwardly pass over the sections of the rope which extend from end to end of the tray to a point near the inner end of the tray, and from thence the sections of the rope which pass from end to end of the tray are located over the sections of the rope which lead inwardly and outwardly. This arrangement permits the dishes to be stacked along the back board and end boards without interfering with each other and also permits the knives, forks, and spoons to be piled in the channel-bracket 2 with their lower ends resting on the tray without interfering with the dishes stacked against the end board 3, as these dishes are prevented from rolling too far inwardly by the longitudinal sections of the rope at the inner portion of the tray. This is clearly illustrated in Fig. 17. This rope 33 is made of absorbent material, so as to readily absorb the water from the dishes resting upon the same. To prevent undue elongation and contraction of the rope under the influence of moisture, I provide a substantially non-elongating cord 38, around which the strands of the rope are twisted. The rope bottom of the tray is normally spaced a short distance above the bottom board 10 of the drainer, so as to wholly support the lighter dishes thereon. The depression of the rope bottom under the weight of the heavier dishes is limited by the rope engaging the said bottom board. By crossing the rope-sections of the bottom of the tray I am enabled to permit the access of air to the interior of the hollow dishes, as shown in Fig. 18, thus facilitating the drying of said dishes.

The dish-drainer constructed, arranged, and operated as hereinabove described forms a very effective device capable of successfully supporting and draining a large number of dishes when in its unfolded position, which drainer may be folded into a compact form when not in use. The rope which forms the bottom of the tray being formed of absorbent material, the moisture running down the edges of the dishes being drained is readily absorbed. The tray may be removed from its position upon the bottom board when desired for purposes of cleansing the same. Furthermore, the parts are so arranged that when the bottom board is folded into its vertical position room is provided between it and the back board for the tray, the bottom of the tray resting upon the hinges between the bottom and back boards.

In common practice when dishes are piled upon a non-absorbent material or in a rack the water runs to the lower edge of the dishes and a portion of the water hangs in drops thereon for many hours. In the case of a cup if it is placed upon its bottom the water runs to the bottom of the cup inside of the same and if the cup is placed upon its edge it takes a very long time for it to dry. The object of my drainer is to remove this water from the dishes rapidly, and in practice I find that the lower edges of the dishes become dry almost as soon as the upper edges and that the dishes require no wiping whatever, thus saving the entire time and labor of wiping the same. It will furthermore be seen that the dishes are held in so nearly a vertical position that the water will run off quickly and the dishes will hold a very slight portion, if any, of water in the chime. Furthermore, the rope tray spaces the dishes evenly apart, so that the air can get at all portions of the dishes. The dishes may also be arranged in systematic order on the tray, so as to facilitate the putting away of the dishes after they become dry.

What I claim is—

1. A folding dish-drainer comprising a back board, a bottom board hinged thereto and a tray located on the bottom board when the bottom board is unfolded and between the bottom board and back board when the bottom board is folded.

2. A folding dish-drainer comprising a back board, end boards hinged to swing horizontally into and out of their folded position and a bottom board hinged to swing vertically into and out of its folded position.

3. A folding dish-drainer comprising a back board, end boards hinged to swing horizontally into and out of their folded position, a bottom board hinged to swing vertically into and out of its folded position and a tray located on the bottom board when the bottom board is unfolded and between the bottom board and back board when the bottom board is folded.

4. A dish-drainer comprising a back board, a bottom board and end boards and a removable tray.

5. A folding dish-drainer comprising a back board, a bottom board and its tray arranged to fold up against the back board and end boards arranged to fold against the bottom board when in its folded position.

6. A folding dish-drainer comprising a back board, a bottom board and its tray fitted to be folded up against the back board, end boards fitted to be folded against the bottom board when the bottom board is in its folded position and spring-catches for yieldingly holding the parts in their folded position.

7. A dish-drainer comprising a back board, end brackets thereon, a bottom board and its tray fitted to fold up into the plane of the brackets and end boards hinged to the brackets fitted to fold against the bottom board when the bottom board is in its folded position.

8. A dish-drainer comprising a back board and a bottom board hinged to swing vertically, the said bottom board being provided with a water-drainage channel formed to receive the water from the surface of the bottom board and convey it away when the bottom board is in its various positions.

9. A dish-drainer comprising a back board, a bottom board hinged thereto to swing vertically and end boards hinged to swing horizontally, the said end boards serving to support the bottom board in an inwardly and downwardly inclined position when the bottom board and end boards are unfolded.

10. A dish-drainer comprising a back board, a bottom board hinged thereto, said bottom board having a channel therein arranged to receive the water from the surface of the bottom board irrespective of the position of the bottom board and a drainage-cup located in position to receive the water from the channel at one end of the bottom board and also irrespective of the position of the bottom board.

11. A dish-drainer comprising a back board, a bottom board and its tray hinged to swing vertically into and out of its folded position and a support for the back board.

12. A dish-drainer comprising a back board, a bottom board and its tray hinged to swing into and out of folded position and a removable support for the back board.

13. A dish-drainer comprising a back board, a bottom board and its tray and a channel-bracket at one end of the back board for partially supporting knives, forks, spoons and the like with their lower ends resting upon the tray.

In testimony that I claim the foregoing as my invention I have signed my name, in presence of two witnesses, this 20th day of May, 1903.

WILLIAM A. McADAMS.

Witnesses:
 FREDK. HAYNES,
 C. S. SUNDGREN.